United States Patent
Bondi

(10) Patent No.: US 7,639,618 B2
(45) Date of Patent: Dec. 29, 2009

(54) SYSTEM AND METHOD FOR RECOGNITION AND CYCLIC SERVICE OF PARTIAL SEQUENCES OF COMMUNICATION REQUESTS

(75) Inventor: Andre B. Bondi, Red Bank, NJ (US)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 457 days.

(21) Appl. No.: 11/419,013

(22) Filed: May 18, 2006

(65) Prior Publication Data
US 2007/0268924 A1 Nov. 22, 2007

(51) Int. Cl.
*H04L 12/26* (2006.01)
*H04L 12/56* (2006.01)
*H04J 3/24* (2006.01)

(52) U.S. Cl. .............. 370/235; 370/412; 370/473

(58) Field of Classification Search ......... 370/229–235, 370/358, 391, 394, 396, 400, 401, 412–418, 370/428, 429, 473
See application file for complete search history.

(56) References Cited

U.S. PATENT DOCUMENTS 6,813,243 B1 * 11/2004 Epps et al. ............... 370/235
2003/0031141 A1 * 2/2003 Schweinhart et al. ........ 370/316
2003/0035385 A1 * 2/2003 Walsh et al. ............... 370/316
2003/0202525 A1 * 10/2003 Nagatomo .................. 370/411
2004/0085964 A1 * 5/2004 Vaananen ................. 370/395.4
2005/0105532 A1 * 5/2005 Yun et al. ................. 370/395.21
2006/0039374 A1 * 2/2006 Belz et al. ................. 370/389

OTHER PUBLICATIONS

Kamoun, Farouk et al., "Analysis of Shared Finite Storage In A Computer Network Node Environment Under General Traffic Conditions," IEEE Transactions on Communications, vol. COM-28 No. 7 pp. 992-1000 (1980).
Bondi Andre B., "Characteristics of Scalability and Their Impact on Performance" Proc. WOSP2000 (Workshop on software Performance), Ottawa, Sep. 2000 pp. 195-203.

* cited by examiner

*Primary Examiner*—Hong Cho

(57) ABSTRACT

A system for servicing a telecommunications conversation comprising one or more messages includes a sequence recognition engine for processing an incoming message, a queue for storing a sequence of messages of said conversation, a length indicator for a message subsequence eligible for processing, a state indicator of said message sequence, and an indicator of a most recently transmitted message of said message sequence. When a new message arrives the sequence recognition engine is invoked to place the message in a correct position in the queue and to determine a next state for the message sequence.

24 Claims, 3 Drawing Sheets

|  | Conversation 1 | Conversation 2 | Conversation 3 | Conversation 4 |
|---|---|---|---|---|
| Number in message queue | 1 | 3 | 1 | 0 |
| Length of eligible sequence | 0 | 2 | 1 | 0 |
| Most recent state in SRE | Message at head out of order | Partial unbroken sequence | Unbroken sequence | Queue empty |
| Most recently transmitted message | D | | | |
| Mutual Exclusion | Free | Occupied | Occupied | Free |
| ID of serving thread | None | 1 | 2 | None |

FIG. 1: Transmission Eligibility Table

| Queue/Position | 1 | 2 | 3 | 4 |
|---|---|---|---|---|
| Conversation 1 | F | | | |
| Conversation 2 | D | E | G | |
| Conversation 3 | A | | | |
| Conversation 4 | | | | |

FIG. 2: Message Queues

SYSTEM AND METHOD FOR RECOGNITION AND CYCLIC SERVICE OF PARTIAL SEQUENCES OF COMMUNICATION REQUESTS

TECHNICAL FIELD

This invention is directed to expediting the servicing of telecommunications requests in computer networks

DISCUSSION OF THE RELATED ART

Scalability is a desirable attribute of a network, system, or process. The concept connotes the ability of a system to accommodate an increasing number of elements or objects, to process growing volumes of work gracefully, and/or to be susceptible to enlargement. When procuring or designing a system, it is often required that it be scalable. The requirement may even be mentioned in a contract with a vendor.

An unscalable system is one in which the additional cost of coping with a given increase in traffic or size is excessive, or one that cannot cope at this increased level at all. Cost may be quantified in many ways, including but not limited to response time, processing overhead, space, memory, or even money. A system that does not scale well adds to labor costs or harms the quality of service. It can delay or deprive the user of revenue opportunities. Eventually, it must be replaced.

The scalability of a system subject to growing demand is crucial to its long-term success. At the same time, the concept of scalability and the understanding of the factors that improve or diminish it are vague and even subjective. Many systems designers and performance analysts have an intuitive feel for scalability, but the determining factors are not always clear. These factors may vary from one system to another.

The scalability of a system may be impaired by inherent wastefulness in frequently repeated actions. It may also be impaired by the presence of access algorithms that lead to deadlock or that result in suboptimal scheduling of resources. Such systems may function well when the load is light, but suffer substantial performance degradation as the load increases. Systems that do not suffer from such impairments are referred to as load scalable. Classical examples of poor load scalability include Ethernet bus contention and busy waiting on locks in multiprocessor systems. Systems with poor load scalability can be hard to model, because they may migrate from a state of graceful function to overload, and perhaps from there into deadlock.

A system is said to have load scalability if it has the ability to function gracefully, i.e., without undue delay and without unproductive resource consumption or resource contention at light, moderate, or heavy loads while making good use of available resources. Some of the factors that can undermine load scalability include (1) the scheduling of a shared resource, (2) the scheduling of a class of resources in a manner that increases its own usage (self-expansion), and (3) inadequate exploitation of parallelism.

A system may also have poor load scalability because one of the resources it contains has a performance measure that is self-expanding, i.e., its expectation is an increasing function of itself. This may occur in queuing systems in which a common first-come-first-serve (FCFS) work queue is used by processes wishing to acquire resources or wishing to return them to a free pool. This is because the holding time of a resource is increased by contention for a like resource, whose holding time is increased by the delay incurred by the customer wishing to free it. Self-expansion diminishes scalability by reducing the traffic volume at which saturation occurs.

In some cases, it might be detected when performance models of the system in question based on fixed point approximations predict that performance measures will increase without bound, rather than converging. In some cases, the presence self-expansion may make the performance of the system unpredictable when the system is heavily loaded. Despite this, the operating region in which self-expansion is likely to have the biggest impact may be readily identifiable: it is likely to be close to the point at which the loading of an active or passive resource begins to steeply increase delays.

Other examples of systems lacking load scalability include systems with repeated unproductive cycling through finite state machines, and systems whose poor load scalability can be overcome with the judicious choice of a job scheduling rule. By an unproductive cycle, we mean a repeated sequence of states in which a process spends an undesirable amount of time using resources without actually accomplishing the goals of the user or programmer. Classical examples include busy waiting on locks in multiprocessor systems, Ethernet bus contention, and solutions to the dining philosophers problem that do not have controls for admission to the dining room. Other examples include systems whose performance does not degrade gracefully as the load on them increases beyond their rated capacity. Some systems or procedures that are perceived as scaling poorly use resources inefficiently. Such systems may hold one or more resources while being in an idle or waiting state, or they may incur overheads or delays that are tolerable at low volumes of activity but not at high volumes.

In a telecommunications service system, sequences of events should be processed in the order in which they occur. These events are typically represented by messages. Since the messages travel to the service point over a connectionless network, they may not arrive in the order of occurrence. Therefore, the messages must be queued and sorted. If all messages from all conversations pass through a single first-come-first serve (FCFS) queue, the absence of one or more messages from a sequence could prevent all events behind it in the queue from being processed.

One method for assuring FCFS delivery of messages is packet reordering, which is used in all implementations the Internet protocol TCP/IP. Queues are often polled in cyclic order to ensure fairness. Cyclic servicing has been used to assure fairness of service to multiple queues for many years. An exemplary application of cyclic servicing is a cashier working at a station with a tray rack on each side, each fed by its own queue. The cashier alternately serves the first customer to the right, then the first customer to the left. This facilitates totaling the order on one side while the most recently served customer on the other side puts change away before leaving the station.

Sequences of events can also be characterized as languages, which can be parsed using a variety of techniques well known in the art of compilers, finite state machines, and finite state machines with push-down stacks. The state machine is used to determine the next action to be taken given the sequence of events that has occurred. Parsing and compiler design techniques can be used to build a generalized sequence recognition engine.

SUMMARY OF THE INVENTION

Exemplary embodiments of the invention as described herein generally include methods and systems for ensuring that partially complete sequences of messages are handled whenever they are available, regardless of their positions relative to those pertaining to other calls in the queue. This reduces post-dial delay and allows the handling of any call with an unbroken sequence of messages to proceed regardless of the state of the other pending calls. Fairness is assured to all calls with outstanding unbroken sequences of events.

According to an embodiment of the invention, there is provided a system for servicing a telecommunications conversation in a computer network, said conversation comprising one or more messages, said system comprising a sequence recognition engine for processing an incoming message, a queue for storing a sequence of messages of said conversation, a length indicator of a length of a message subsequence eligible for processing, a state indicator of a state of said message sequence, and an indicator of a most recently transmitted message of said message sequence, wherein when a new message arrives said sequence recognition engine is invoked to place said message in a correct position in said queue and to determine a next state for said message sequence.

According to a further embodiment of the invention, the state indicator of said message sequence indicates whether a message sequence includes out-of-order messages, whether a message sequence of in-order messages is eligible for servicing, or whether the queue is empty.

According to a further embodiment of the invention, the system comprises an exclusive access controller to control access to said queue and its associated data; and a pointer to a thread currently operating on said queue.

According to a further embodiment of the invention, the system further comprising a servicing thread that checks said exclusive access indicator, and if no other thread is servicing said queue, said servicing thread checks for the presence of a message sequence in said queue that is eligible for servicing, and processes said eligible sequence if said eligible sequence is present.

According to a further embodiment of the invention, the next state of the message sequence comprises one of whether said new message is eligible for servicing or whether said new message must await the arrival of one or more predecessor messages before being serviced.

According to a further embodiment of the invention, the system comprises a plurality a queues for servicing a plurality of conversations, wherein each conversation is associated with one queue, and wherein said servicing thread processes each queue in an order that is probabilistically certain to service each queue within a bounded amount of time, wherein if said servicing thread detects another thread servicing a queue of that a queue does not have an unbroken sequence, said servicing thread services a next queue.

According to a further embodiment of the invention, a message subsequence eligible for processing comprises an unbroken sequence of one or more messages wherein each message is a beginning message of said sequence or a successor of the preceding message, and is a predecessor of either the following message or is a terminating message of said sequence.

According to a further embodiment of the invention, a beginning message of said sequence either follows or is a successor of the most recently transmitted message.

According to a further embodiment of the invention, the system comprises a counter for storing the total number of messages in said queue.

According to a further embodiment of the invention, the servicing thread processes the set of queues in a round robin order.

According to an embodiment of the invention, there is provided a method for servicing a telecommunications conversation in a computer network, said conversation comprising one or more messages, including providing a dedicated queue for a conversation, receiving an incoming message of said conversation, checking said queue associated with said conversation and inserting said message into a proper position in said queue, and servicing said message if said incoming message is eligible for processing.

According to a further embodiment of the invention, checking said queue comprises determining that no other process is servicing said queue.

According to a further embodiment of the invention, inserting said message into a proper position comprises placing said incoming message behind any preceding messages in said queue, and placing said incoming message ahead of any subsequent messages, wherein said subsequent messages are moved back in the queue.

According to a further embodiment of the invention, the method comprises determining if said incoming message is eligible for processing by checking a state of said queue, wherein said state indicates whether a message sequence includes out-of-order messages, whether a message sequence of in-order messages is eligible for servicing, or whether the queue is empty.

According to a further embodiment of the invention, the incoming message is eligible for processing if it is a single message that immediately follows a most recently processed message, or if said incoming message when placed in a sequence of messages in said queue forms an unbroken sequence of messages wherein a beginning message immediately follows said most recently processed message and each subsequent message is a successor of the preceding message.

According to a further embodiment of the invention, servicing said incoming message comprises transmitting said incoming message or a sequence of messages containing said incoming message.

According to a further embodiment of the invention, the method comprises determining a number of messages in said queue, determining a most recently transmitted message, and determining a state of said message sequence.

According to an embodiment of the invention, there is provided a program storage device readable by a computer, tangibly embodying a program of instructions executable by the computer to perform the method steps for servicing a telecommunications conversation in a computer network.

BRIEF DESCRIPTION OF THE DRAWINGS

FIG. 1 illustrates a fixed size transmission eligibility table according to an embodiment of the invention.

FIG. 2 illustrates an exemplary set of queues and their associated conversations according to an embodiment of the invention.

DETAILED DESCRIPTION OF THE PREFERRED EMBODIMENTS

Figure 3:
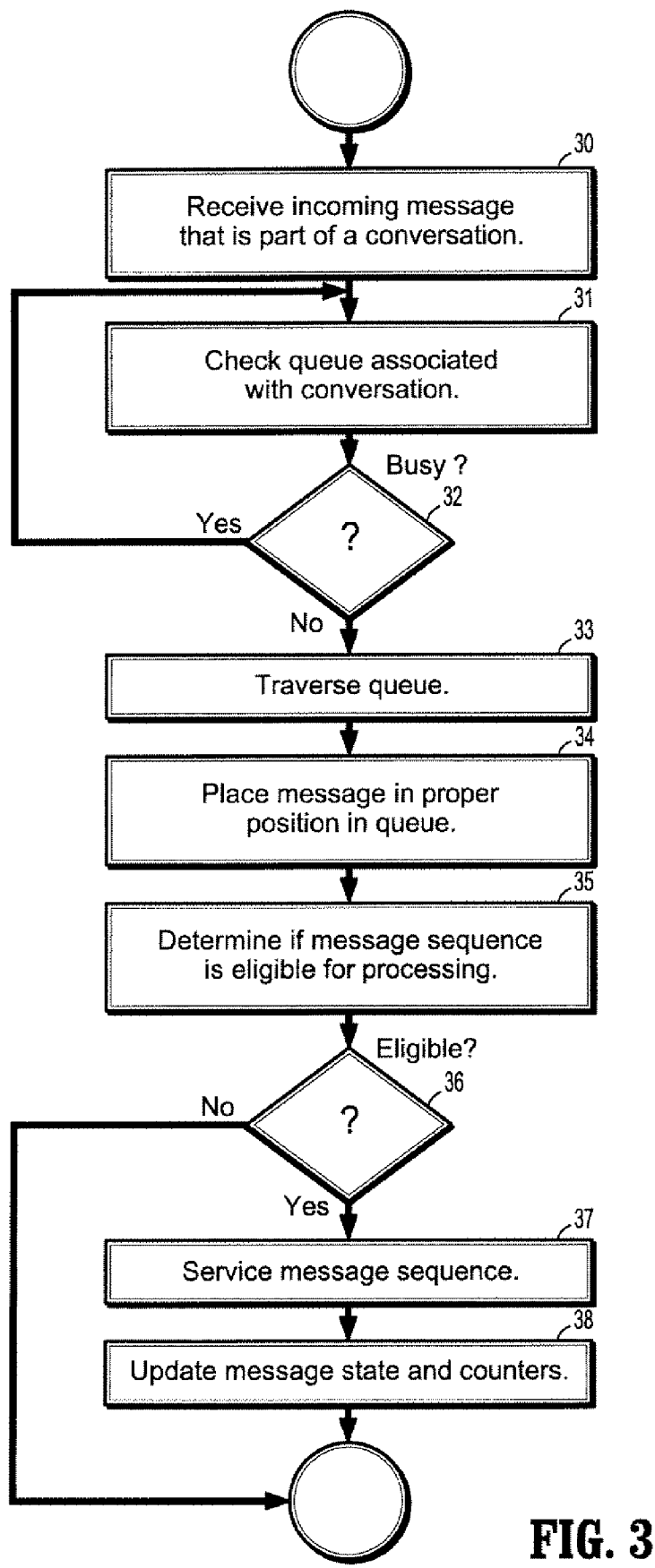
FIG. 3 is a flow chart of a process for servicing partial sequences of communication requests, according to an embodiment of the invention.

Exemplary embodiments of the invention as described herein generally include systems and methods for recognizing and cyclically servicing partial sequences of communication requests. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

An exemplary system lacking load scalability is a museum checkroom. This is a simplification of a problem occurring in replicated database systems. At a museum checkroom, visitors are required to join a common FCFS queue to deposit and collect their coats. The scarce resources are coat hangers (passive) and attendants (active). Coats are placed on hangers, which are hung on carousels, each of which is maintained by a dedicated attendant. An attendant taking a coat performs a linear search on the assigned carousel to find an empty hanger, or to find the visitor's coat. The objective is to minimize the time spent queuing to pick up or leave a coat.

The, system is prone to deadlock at heavy loads, e.g., during the winter holiday season. In the morning most visitors are leaving their coats; in the evening they are all picking them up. The deadlock problem arises at midday or in the early afternoon, when many might be doing either. Deadlock occurs when the hangers have run out, and visitors wishing to collect coats are stuck in the queue behind those wishing to leave them. Attendants can break the deadlock by asking those who wish to collect coats to come forward. This amounts to the resolution of deadlock by timeout, which is inefficient, because it causes enforced idleness when useful work (distributing coats, and hence freeing hangers) could be done.

With its original service rules, the museum checkroom will function adequately at light loads and with low hanger occupancy, but will almost certainly deadlock at some point otherwise. Regardless of the number of attendants and the number of coat hangers, the system is likely to go into deadlock if the volume of traffic is heavy enough. Increasing the number of hangers only defers the onset of deadlock; it does not eliminate the possibility. Load scalability is further undermined because the holding time of a currently occupied hanger is increased in two ways:

1. The search time for unused hangers increases as the hanger occupancy increases.

2. A customer arriving to collect a coat (and thus free a hanger) must wait behind all other waiting customers, including those wishing to leave coats. This increases the time to free a hanger.

Both of these factors make the hanger holding time self-expanding. If the holding time is self-expanding, the product of the customer arrival rate and the hanger holding time, i.e., the expected number of occupied hangers, will increase to exceed the total number of hangers even if the customer arrival rate does not increase. This is a sure sign of saturation.

For this system, enforced idleness can be avoided by providing separate queues for those collecting and leaving coats, with (non-preemptive) priority being given to the former so as to free the hangers as quickly as possible. This priority ordering reduces the tendency of the holding time to be self-expanding. Deadlock is avoided because the priority rule guarantees that a hanger will be freed if someone arrives to collect a coat. This modification yields benefits by eliminating the risk of deadlock and reducing hanger occupancy.

The Museum Checkroom is analogous to a computer system in the following ways. The visitors correspond to processes. The carousels and hangers respectively correspond to memory banks and memory partitions. The attendants correspond to processors. Finally, the corridor between the carousels and the counter at which visitors arrive collectively correspond to a shared memory bus via which all memory banks are accessed. This is an example in which the main (and most easily surmounted) impediment to scalability lies in the mechanism for scheduling service, rather than in the unproductive consumption of cycles.

According to an embodiment of the invention, given a plurality of conversations occurring in a telecommunications network, each conversation between a source and destination is provided with its own queue for storing messages associated the conversation. The messages are stored in the corresponding queue in the order in which they were generated at the source. Having one conversation per queue prevents one or more incomplete sequences of waiting messages pertaining to one or more conversations from delaying the handling of one or more complete sequences in one or more other conversations.

A sequence recognition engine (SRE) is provided according to an embodiment of the invention that can determine whether the sequence that is buffered in the queue is complete or has missing components. The SRE can also determine whether a message arriving at an empty queue is eligible for processing, or whether that message must wait for the arrival of one or more predecessor messages before being dispatched. The SRE traverses a queue whenever a there is new message to be added to it, to check for predecessor messages.

According to an embodiment of the invention, each conversation is associated with information, including the following.

1. Its own queue.

2. A field recording the length of the unbroken sequence beginning at the head of the queue. This number represents the number of eligible packets awaiting transmission. If the entry is zero, there are no eligible packets awaiting transmission.

3. The state of the message sequence, based on the most recently transmitted message if the queue is empty, or on the messages currently present, if any, along with their eligibility for transmission. The state can be used to determine whether the next message to arrive is immediately eligible for transmission.

4. The most recently transmitted message.

5. To facilitate handling of all queues by multiple threads or processors, a data structure that controls exclusive access to the queue and the data associated with it.

6. A pointer to the thread currently operating on the queue.

If a message was previously missing from a sequence and its insertion results in the presence of an unbroken sequence beginning at the head of the queue, the length of the eligible sequence is updated.

According to an embodiment of the invention, there is provided a transmission eligibility table (TET) for storing the information associated with each conversation wherein each conversation is associated with a column in the table. In one embodiment of the invention, the TET can be implemented in a dynamic storage so that it can expand or contract in size, depending on the number of conversations being serviced. A fixed size table according to another embodiment of the invention is illustrated in FIG. 1. The TET stores all of the information needed to track the presence of an eligible message sequence in a queue. This data structure is queried by a service process or thread when it is available to handle the next message. An exemplary set of queues and their associated conversations is illustrated in FIG. 2.

Referring first to FIG. 2, the queues are represented by the table depicted therein, wherein each row of the table represents one queue, and each column is a message holder. For illustrative purposes, 4 queues are illustrated each having 4 message position holders. In the queues depicted, queue 1 is associated with conversation 1, and so forth. The conversations are represented by message types labeled by letters of the alphabet, so that, for example, a message of type E should precede a message of type F, which in turn should precede a message of type G, etc. Conversation 1 includes a message type F, conversation 2 includes messages of types D, E, and G, while conversation 3 has only a message of type A.

Referring now to FIG. 1, it can be seen that for conversation 1, the most recently transmitted message is of type D, but the sole message queued for transmission is of type F. This message has arrived before a message of type E, and is therefore not eligible for transmission. Thus, the number of messages eligible for transmission for conversation 1 is zero. It can also be seen that the mutual exclusion flag for conversation 1 is free, indicating that no processes or threads are servicing this queue. Messages of types D, E, and G are queued for conversation 2, but F is missing. So, three messages are present, but only two are available for transmission. A single message of type A is queued for conversation 3, which is eligible for transmission. No messages have been transmitted for conversations 2 and 3. Note that the mutual exclusion flags for conversations 2 and 3 are both set to occupied, with serving thread 1 servicing conversation 2 and serving thread 2 servicing conversation 3. Queue 4, which is associated with a fourth conversation, is empty, having no messages enqueued for processing, and its mutual exclusion flag is set to free.

When a new message arrives, the SRE is invoked to place it in the correct position in the queue and determine the next action. For example, if a message of type E arrives for conversation 1, it will be placed in the queue ahead of F, which will be bumped back position 2 in the queue. Similarly, if a message of type F arrives for conversation 2, it will be placed in the queue between E and G. Message G will be bumped back one position, and the length of the unbroken sequence eligible for transmission will increase from 2 to 4.

The queues are serviced as follows, according to an embodiment of the invention. A servicing process or thread, hereinafter referred to as a servicing thread without loss of generality, goes from queue to queue in an order that is probabilistically sure to service each queue within a bounded amount of time. One exemplary, non-limiting order that meets this criterion is to service the set of queues in a round robin order. After checking that no other servicing thread is accessing the current queue, it checks for the presence of an unbroken sequence starting at the head of the queue. If there is no unbroken sequence, or if the queue is currently being accessed by another servicing thread, the servicing thread proceeds to the next queue. Otherwise, the servicing thread causes all waiting messages in the unbroken sequence to be processed.

Note that even if the queue is nonempty, the first item in the queue may not be the one that should immediately follow the most recently served item, so it must wait until its (possibly more than one) missing predecessor(s) appear(s), or until a timeout forces exception handling. An issue arises in the case of a lone message or consecutive messages widely separated in time. A lone message can be handled by the SRE if the language is unambiguous, if a lone symbol is always alone, and never part of a group. But in a case where, in light traffic, two consecutive messages arrive some time apart, the first would be sent off immediately, but the second could not be sent until it was noted that a valid predecessor had been sent before it. However, keeping track of the most recently transmitted message, as indicated in the $5^{th}$ row of the exemplary table of FIG. 1 will solve this deficiency.

FIG. 3 is a flow chart of a process for servicing partial sequences of communication requests, according to an embodiment of the invention. Referring now to the flowchart, an incoming message of a conversation is received by a computing node on a network at step 30. This computing node could be, by way of example, an Internet router, a computer workstation, a handheld computing device such as a PDA or a wireless telephone, etc. The arrival of the message invokes the SRE which checks at step 31 the queue associated with the message's conversation. If, at step 32, the queue is not being serviced by some other process, the SRE traverses the queue at step 33, sets the exclusive access controller and sets the thread pointer to itself. If the queue is busy, the SRE waits until it is free. By comparing the message type with the message types of messages in the queue, the SRE places at step 34 the incoming message in its correct position in the queue, and possibly bumps some previously received messages further back in the queue. The SRE updates the number of messages in the queue. Then, at step 35, the SRE examines the sequence of messages to determine if the sequence, or some subsequence thereof, forms an unbroken sequence of messages. If there is an unbroken sequence of messages, the SRE also determines if the beginning message of the unbroken sequence is at the head of the queue, and if so, whether the beginning message immediately follows the most recently processed message. If these conditions are satisfied at step 36, the unbroken sequence of messages is processed art step 37, and the TET is edited to update at step 38 the most recently transmitted message field and the state of the message sequence. After processing and updating, or if there are no sequences eligible for processing, the SRE exits, clearing the exclusive access controller and thread pointer, and the process exits to a listening state to await the next incoming message.

Servicing any eligible unbroken sequence of messages allows calls to be handled as quickly as possible, and reduces the possibility of a call being delayed because there is a broken sequence associated with some other call. This in turn reduces processing delays and allows maximum use of network equipment, while improving customer experience. System throughput is also improved by elimination of the software bottleneck that would be caused by only allowing use of a single queue for all message handling. A system according to an embodiment of the invention removes messages from the message queue as early as possible, reducing buffer occupancy and risk of message loss. A system according to an embodiment of the invention can be generalized to allow interleaving of event handling pertaining to any set of conversations by one or more threads. The use of a generalized SRE allows calls to be handled for a variety of message sequence types corresponding to different types of switching equipment and services at any arbitrary set of source/destination pairs. Note that the previously mentioned parsing and compiler design techniques can be used to build such a generalized SRE.

By setting up separate dispatch queues for each conversation, if a system is not saturated, all arriving jobs may be expected to be served within a finite amount of time, the service ordering is given without respect to the expected service time, and, the server is not obstructed if a job can be handled. No message will be obstructed by one that cannot be served. This is an extension of the "museum checkroom queuing principle": you do not have a common single queue for those leaving and picking up coats. Rather, provide separate queues for each and serve those picking up coats first, to minimize coat hanger occupancy. This also prevents the deadlock that would ensue with the common queue if all hangers were occupied and those leaving coats were ahead of those picking them up. Similarly, according to embodiments of the present invention, it prevents incomplete sequences of messages associated with one or more calls from blocking the dispatch of any complete sequence of messages. The extra cost in having a plurality of queues is primarily in determining the queue to which the next incoming packet should be mapped. There is some cost associated with the SRE, but a multithreaded embodiment would make good use of multiprocessors to reduce delays. Notice also that each queue in the set may be of fixed size, or of variable size drawn from a fully shared pool of buffers, an arrangement referred to as Complete Sharing, or of variable size with a small dedicated set of buffers and a pool of buffers shared by all queues, an arrangement referred to as Sharing with Minimum Allocation.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 4:
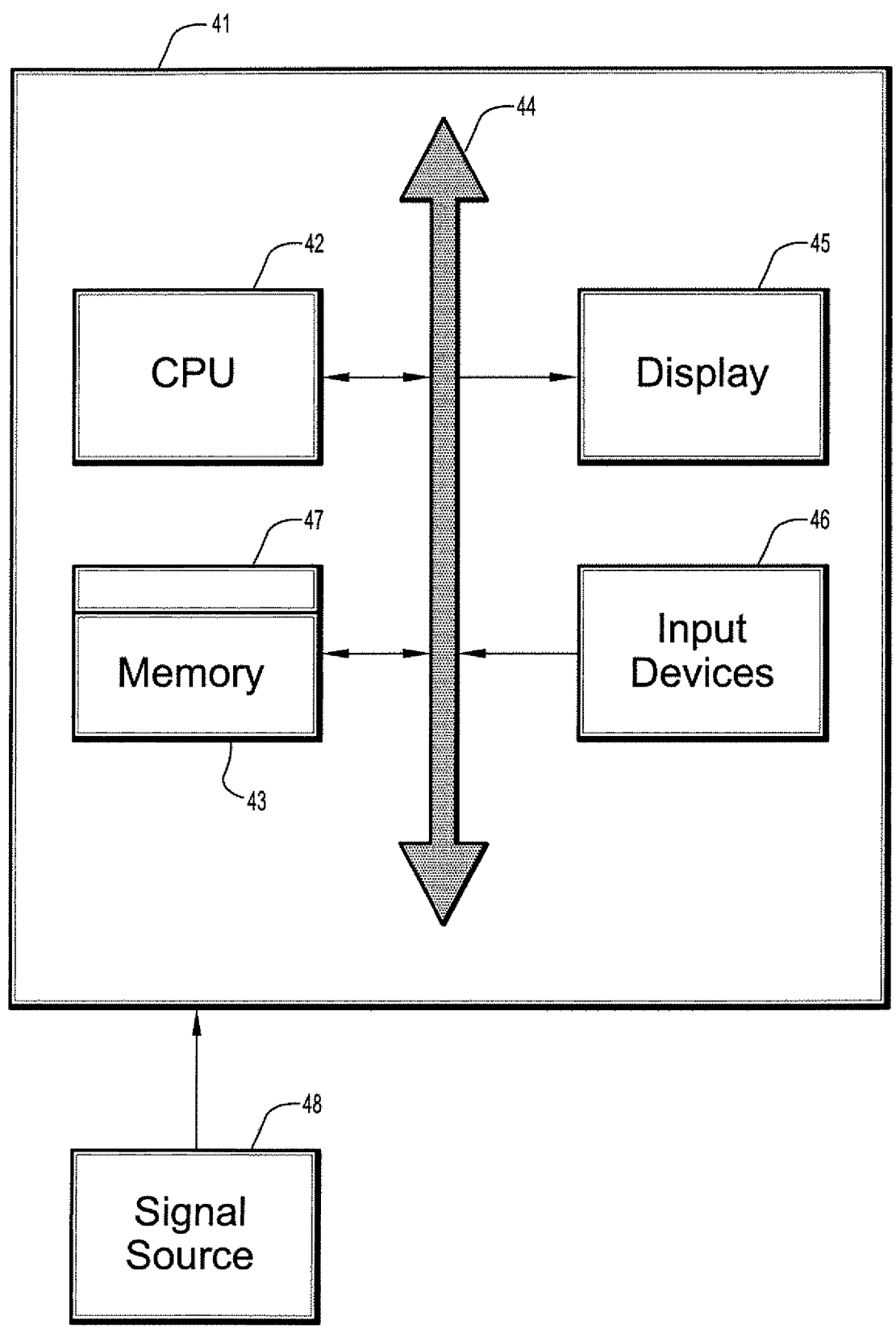
FIG. 4 is a block diagram of an exemplary computer system for implementing a process for servicing partial sequences of communication requests, according to an embodiment of the invention.

FIG. 4 is a block diagram of an exemplary computer system for implementing a process for servicing partial sequences of communication requests according to an embodiment of the invention. Referring now to FIG. 4, a computer system 41 for implementing the present invention can comprise, inter alia, a central processing unit (CPU) 42, a memory 43 and an input/output (I/O) interface 44. The computer system 41 is generally coupled through the I/O interface 44 to a display 45 and various input devices 46 such as a mouse and a keyboard. The support circuits can include circuits such as cache, power supplies, clock circuits, and a communication bus. The memory 43 can include random access memory (RAM), read only memory (ROM), disk drive, tape drive, etc., or a combinations thereof. The present invention can be implemented as a routine 47 that is stored in memory 43 and executed by the CPU 42 to process the signal from the signal source 48. For an embodiment of the present invention, the signal source can be a telecommunications network communication or another network connection as is known in the art, such as an Internet connection. As such, the computer system 41 is a general purpose computer system that becomes a specific purpose computer system when executing the routine 47 of the present invention.

The computer system 41 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A system for servicing a telecommunications messages in a computer network, said system comprising:
   a sequence recognition engine for processing an incoming message;
   a plurality of queues for storing messages, each queue storing a respective sequence of messages;
   a length indicator for each queue, the length indicator indicating a length of a message subsequence of the sequence of messages eligible for processing;
   a state indicator for each queue, the state indicator indicating a state of the sequence of messages
   the sequence recognition engine being configured to place the incoming message in a chronological position in a queue and to determine a next state for the sequence of messages; and
   a servicing thread that processes at least one of the queues, the servicing thread configured to not process the message subsequence if the length indicator indicates that the message subsequence is not eligible for processing.

2. The system of claim 1, wherein said state indicator of the sequence of messages indicates whether the sequence of messages includes out-of-order messages, whether the sequence of messages has in-order messages eligible for servicing, or whether the queue is empty.

3. The system of claim 1, further comprising an exclusive access controller to control access to the queues and data associated with the queues, and a pointer to a thread currently operating on one of the queues.

4. The system of claim 1, wherein the servicing thread is configured to check an exclusive access indicator to determine if a queue is being serviced and if no other thread is servicing the queue, said servicing thread checks for the presence of at least one message in the queue that is eligible for servicing, and processes an eligible message if the eligible message is in the queue.

5. The system of claim 1, wherein said next state for said sequence of messages indicates whether said new message is eligible for servicing or whether said new message must await the arrival of one or more predecessor messages before being serviced.

6. The system of claim 1 wherein said servicing thread processes each queue in an order that is probabilistically certain to service each queue within a bounded amount of time, wherein if said servicing thread detects another thread servicing a queue or that a queue does not have an unbroken subsequence of messages or sequence of messages, said servicing thread services another queue.

7. The system of claim 1, wherein a message subsequence eligible for processing comprises an unbroken sequence of at least one message.

8. The system of claim 7, wherein the unbroken sequence is comprised of a beginning message of the message subsequence that immediately follows a most recently transmitted message of the sequence of messages.

9. The system of claim 1, further comprising at least one counter for storing the total number of messages in a queue.

10. The system of claim 6, wherein said servicing thread processes the queues in a round robin order.

11. A method for servicing a telecommunications messages in a computer network, said method comprising:

providing a plurality of dedicated queues, each queue being for a respective chronological sequence of messages;

receiving an incoming message;

checking a queue associated with the received incoming message;

inserting the incoming message into the queue chronologically such that the incoming message is positioned in the queue after a message that was transmitted before the incoming message; and servicing the incoming message if the incoming message is eligible for processing, the incoming message being eligible for processing if the incoming message is a single message that immediately follows a most recently processed message in the queue or if the incoming message is positioned in a queue and forms an unbroken sequence of messages in chronological order within the queue, a beginning message of the unbroken sequence being a message that immediately succeeds a most recently processed message in the queue.

12. The method of claim 11, wherein checking said queue comprises determining that no other process is servicing said queue.

13. The method of claim 11, wherein inserting the incoming message comprises placing said incoming message behind any preceding messages in said queue, and placing said incoming message ahead of any subsequent messages, wherein said subsequent messages are moved back in the queue.

14. The method of claim 11, further comprising determining if said incoming message is eligible for processing by checking a state of said queue, wherein said state indicates whether a message sequence includes out-of-order messages, whether a message sequence of in-order messages is eligible for servicing, or whether the queue is empty.

15. The method of claim 14, wherein the incoming message is the beginning message of the unbroken sequence or is an intermediate message of the unbroken sequence that succeeds the beginning message of the unbroken sequence.

16. The method of claim 11, wherein servicing said incoming message comprises transmitting said incoming message or a sequence of messages containing said incoming message.

17. The method of claim 11, further comprising determining a number of messages in said queue, determining a most recently transmitted message, and determining a state of the sequence of messages.

18. A program storage device readable by a computer, tangibly embodying a program of instructions executable by the computer to perform the method steps for servicing telecommunications messages in a computer network, said method comprising the steps of:

providing a plurality of dedicated queues, each queue being for a respective chronological sequence of messages;

receiving an incoming message;

checking a queue associated with the received incoming message;

inserting the incoming message into the queue chronologically such that the incoming message is positioned in the queue after a message that was transmitted before the incoming message; and servicing the incoming message if the incoming message is eligible for processing, the incoming message being eligible for processing if the incoming message is a single message that immediately succeeds a most recently processed message in the queue or if the incoming message is positioned in a queue and forms an unbroken sequence of messages in chronological order within the queue, a beginning message of the unbroken sequence being a message that immediately follows a most recently processed message in the queue.

19. The computer readable program storage device of claim 18, wherein checking said queue comprises determining that no other process is servicing said queue.

20. The computer readable program storage device of claim 18, wherein inserting said incoming message comprises placing said incoming message behind any preceding messages in said queue, and placing said incoming message ahead of any subsequent messages, wherein said subsequent messages are moved back in the queue.

21. The computer readable program storage device of claim 18, the method further comprising determining if said incoming message is eligible for processing by checking a state of said queue, wherein said state indicates whether a message sequence includes out-of-order messages, whether a message sequence of in-order messages is eligible for servicing, or whether the queue is empty.

22. The computer readable program storage device of claim 21, wherein the incoming message is the beginning message of the unbroken sequence or is an intermediate message of the unbroken sequence that succeeds the beginning message of the unbroken sequence.

23. The computer readable program storage device of claim 18, wherein servicing said incoming message comprises transmitting said incoming message or a sequence of messages containing said incoming message.

24. The computer readable program storage device of claim 18, the method further comprising determining a number of messages in said queue, determining a most recently transmitted message, and determining a state of the sequence of messages.

* * * * *